Aug. 7, 1962 E. G. THURSTON ET AL 3,048,815

LOW FREQUENCY TRANSDUCER

Filed Nov. 5, 1952 2 Sheets-Sheet 1

INVENTORS
EDWARD G. THURSTON
DONALD W. KUESTER

BY G. D. O'Brien
R. M. Hicks
ATTORNEYS

INVENTORS
EDWARD G. THURSTON
DONALD W. KUESTER

BY

G. D. O'Brien
R. M. Hicks
ATTORNEYS

United States Patent Office 3,048,815

Patented Aug. 7, 1962

3,048,815

LOW FREQUENCY TRANSDUCER

Edward G. Thurston, Columbus, Ohio, and Donald W. Kuester, Hyattsville, Md., assignors to the United States of America as represented by the Secretary of the Navy Filed Nov. 5, 1952, Ser. No. 318,968
4 Claims. (Cl. 340—10)
(Granted under Title 35, U.S. Code (1952), sec. 266)

The invention described herein may be manufactured and used by or for the Government of the United States of America for governmental purposes without payment of any royalties thereon or therefor.

This invention relates to an underwater transducing device and more particularly to a barium titanate piezoelectric type ceramic crystal structure and a new and novel manner of mounting and loading the same.

The instant invention is particularly adapted for low frequency underwater signalling and detection at frequencies in the range of 5 to 400 cycles per second and provides increased sensitivity characteristics over prior art underwater crystal type transducers.

In prior art crystal mounting structures various means have been resorted to in an attempt to obtain improved multi-directional peripheral flexing action of the crystal and various methods of loading the crystal plane to provide greater sensitivity have evolved from these explorations in this field. The means resorted to have included arrangements for supporting the crystal by clamps or other suitable mounting elements or the like at the edges thereof or at the outer extremities or end thereof, and electrically connected in an oppositely polarized relationship at the half area point with respect to the clamping position. This is basically a simply supported continuous beam arrangement.

Additional arrangements have included the loading and support of the crystal in a cantilever beam relationship wherein the support is by a transverse plane or supporting wall member attached to a rigid support therefor and to the crystal at one centerline thereof in a manner whereby a lateral bending moment may be imparted from the signal wave energy to the crystal.

Other prior arrangements include a column type support and loading element attached in electrical conductive relationship therewith at the crystal center, and with support structure of a nature, such for example as a column member, a quarter wave length in extent to minimize standing wave effects, mounted thereon in a normal relationship thereto.

The instant invention relates to the use of a pair of parallel associated circular Bimorph crystal discs of the barium titanate ceramic variety which are centrally supported by a common cylindrical pillar, the opposite ends of which are located at the respective interior centers of the two crystals, and in which the outer circular configuration of each is masked in a conjoint relationship by a "Sylphon" bellows member connected to and extending between the respective peripheral edges of the two crystals.

The advantageous radial and tangential stressing of disc configured crystals displaying radially uniform piezoelectric properties characteristic of barium titanate elements, as accomplished by the instant centrally loaded peripherally unrestrained crystal support structure therefor, when subjected to bending moments correlative with applied compressional wave energy effects, is such as to provide a suitably polarized voltage output of comparatively high order. This arrangement which is applicable to a single Bimorph crystal is particularly adaptable to a spaced dual Bimorph construction. The instant description is directed to the latter preferred embodiment and additionally to certain improved relationships of the electrode areas of Bimorph discs of either the single or spaced dual type. Although substantially complete electroding of the crystal faces will provide satisfactory results, increased voltage output may be derived by a construction in which the electroded areas are sectors or segments of non-coextensive nature with respect to the disc. The polarization is carried out in a manner permitting series connection of the electrode areas of suitably polarized piezoelectric segments of a single Bimorph ceramic element as well as the electrode areas of each disc of both the upper and lower Bimorph of the pair used in a dual type unit. In a construction of this nature, similarly configured parallel electrode areas of each disc of the Bimorph, and comprising one microphone element, are separated by the common mutually adjacent non-electroded face area of high dielectric constant of the ceramic disc, substantially as illustrated and hereinafter described in greater detail. Under signal load influences they permit either a direct electrical or a contacting connection of the oppositely polarized electrodes of any two microphone segments depending respectively on the electroding arrangement thereof or that existing at assembly, to produce a series additive voltage output therefrom.

In the Bimorph relationship of these crystals the two elements are assembled in a manner such that the polarities of the two contacting electrode faces of the adjacent crystals are of the same sign at the normal or static condition thereof. In this manner of assembly, there is no change of polarity in the one of the Bimorph disc elements which is under compression, while the other undergoes a polarity reversal which produces a series connected voltage relationship across the tensionally stressed strata or disc element of the Bimorph; the composite effect of which is the production of an additive voltage therethrough. The outer electrodes of this pair of segments are directly connected, respectively to the preceding and succeeding adjacent electrode segments.

The piezoelectric characteristics of this type crystal differ from that of conventional ammonium di-hydrogen phosphate (ADP) or Rochelle salt type crystal structure in that the instant barium titanate crystal displays radially uniform piezoelectric properties while these others do not.

In accordance with the foregoing one feature of the instant invention relates to providing a hydrophone having a greater low frequency sensitivity than that of prior devices, and in a crystal arrangement of transducer structure wherein all of the advantages of prior art crystal loading devices are obtained with a barium titanate crystal and many of the disadvantages of those units as heretofore or now in general use are obviated.

One object of the present invention is to provide a piezoelectric transducer structure in which certain mounting features are incorporated which relate to the provision of greater ease of construction and higher sensitivity.

An additional object of this invention relates to the provision of a disc type piezoelectric Bimorph crystal with loading and mounting structure of high sensitivity and efficiency wherein the peripheral support is compliant to crystal deformation and in coaxial relationship with a substantially rigid central loading arrangement therefor.

In correlation with the immediately foregoing object it is a further object of the instant invention to provide an axially compliant support and coaxial loading arrangement for a crystal which provides for substantially uniform radial deformation of the crystal by the signal energy.

A further object of the invention resides in the novel combination of a pair of Bimorph crystal elements and a conjoint resilient peripheral masking element therefor in coaxial relationship with a common loading member whereby piezoelectric response to greatly increased bending stresses produces increased undistorted sensitivity over conventional crystal loading arrangements.

Another object of this invention resides in the incorporation of a plurality of pressure sensitive piezoelectric voltage generation regions on a single ceramic crystal.

In correlation with the immediately preceding object it is a further object to provide a plurality of pressure sensitive voltage generating areas wherein the several areas thereof are subjected to substantially equal stressing.

Other objects and many of the attendant advantages of this invention will be readily appreciated as the same becomes better understood by reference to the following detailed description when considered in connection with the accompanying drawings wherein.

Figure 4A:
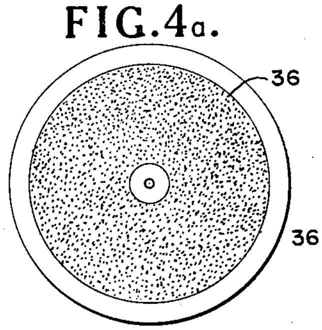
Figure 4B:
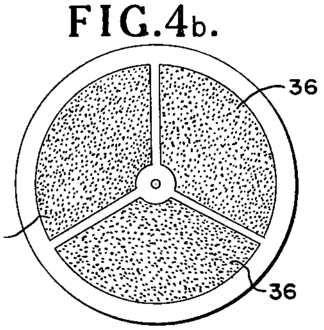
Figure 4C:
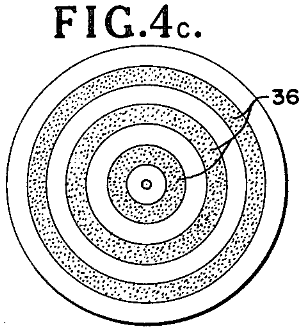
Figures 5A, 5B:
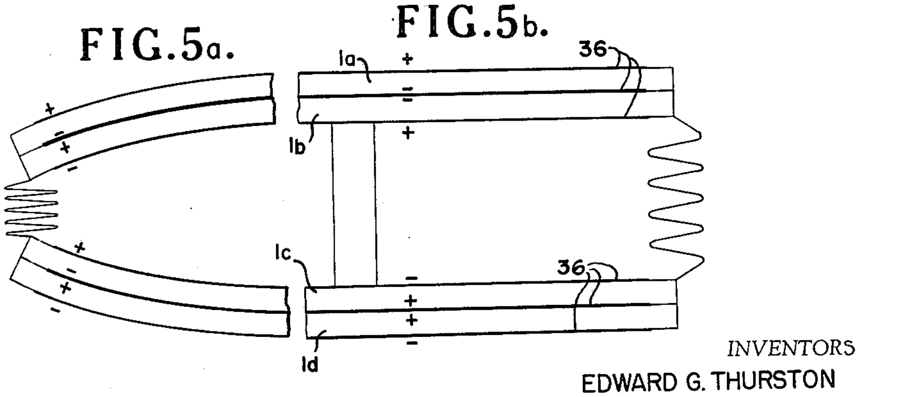

FIGS. 4*a*, 4*b* and 4*c* are illustrations in plan, showing several modifications of electrode area configurations; and, FIGS. 5*a* and 5*b* comprise a composite diagrammatic illustration showing the crystal polarities under signal loaded conditions at 5*a* and the assembled polarities under static conditions at 5*b* thereof.

Figure 1:
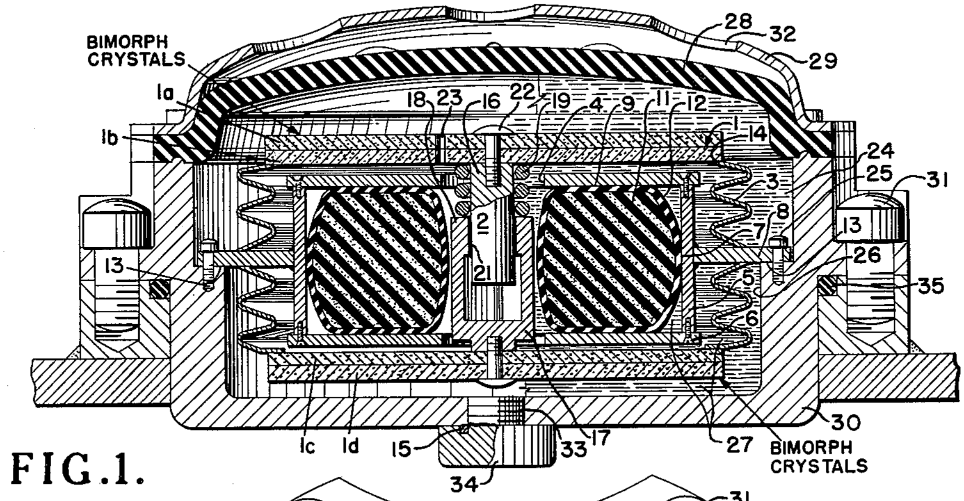
FIG. 1 is a sectional view in vertical elevation showing in general the support and loading arrangements of the device.
Figure 2:
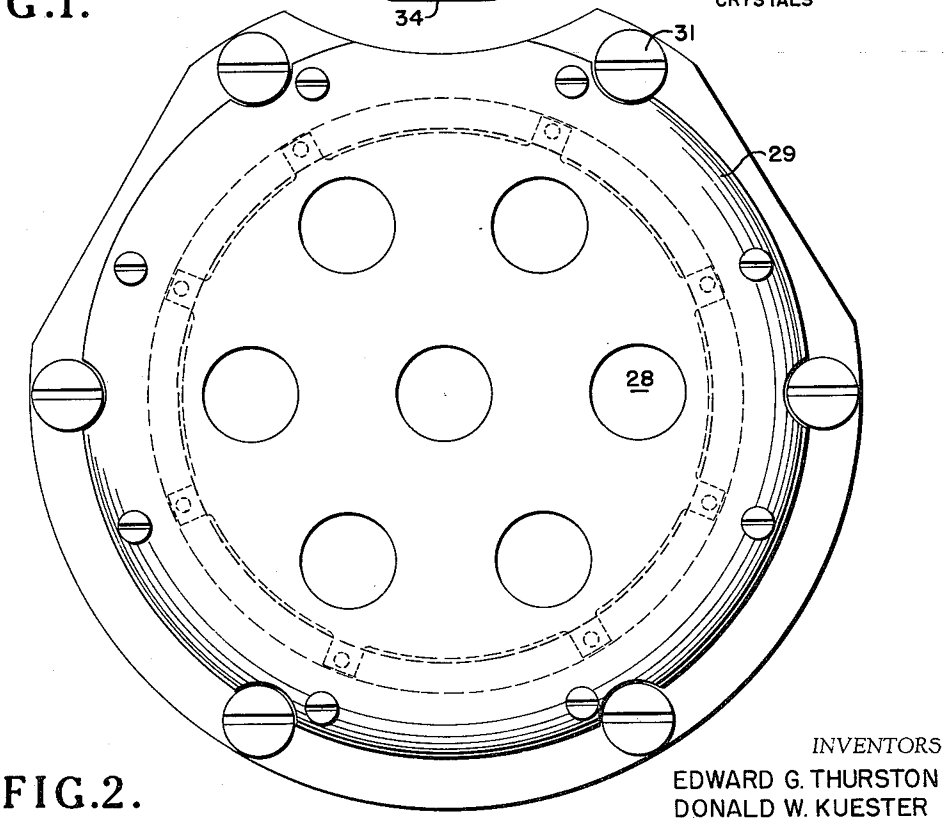
FIG. 2 is a view in plan of the transducer assembly of FIG. 1.
Figure 3:
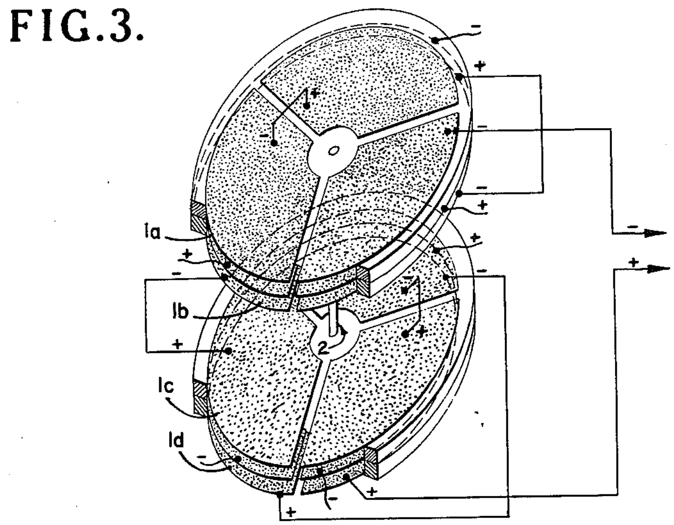
FIG. 3 is a diagrammatic view illustrating the manner of electrically connecting the electrode areas of one embodiment of the instant invention.

Referring now more particularly to FIGS. 1 and 3 of the drawings there is shown in parallel spaced relationship the pairs of peripherally mounted piezoelectric crystal elements 1 comprising crystal elements 1*a*, 1*b*, and the pair of crystal elements 1*c* and 1*d*. These elements may be of any suitable ceramic piezoelectric crystal material having radially uniform piezoelectric characteristics. The preferred embodiment of the instant invention for purposes of illustration is directed to an element comprising plate or disc elements of fabricated barium titanate crystals. The plates or crystal elements 1, are disposed in parallel relationship for transverse loading by the rod assembly 2 which is arranged in a concentric relationship with the "Sylphon" bellows support element 3.

The electrical connections thereof may advantageously be made at the loading rod and at the peripheral edge adjacent the bellows and carried out through the casing wall in a manner not shown, through suitable sealed through-panel insulators by terminal structure of a conventional nature.

The interior assembly of the "Sylphon" bellows unit additionally includes a pair of circular disc members 4, maintained in spaced relationship by a plurality of supporting rods 5 therefor, which may be attached thereto in any suitable manner as by screws as shown at 6. The center portion 7 of the bellows 3 is suitably attached to the spider element 8 for suspensional support therefrom. The bellows is arranged in concentric encasing relationship with respect to the annular rubber tube assembly 9 which generally comprises a doughnut shaped gas bag arrangement filled with a sponge type rubber or synthetic rubber at 11 and encased by a rubber skin 12.

The circular disc members 4 are positioned by the spider and rod assembly and maintained thereby in a spaced adjacent relationship with respect to the normal positions of the inner circular disc elements 1 of the pair of Bimorph crystals to function in conjunction with the spider support 13 in an arrangement to prevent excessive deformation of the crystal element under adverse underwater explosive effects such for example as by countermining, mine explosions adjacent thereto or other explosions of high intensity. In a preferred embodiment of the invention the crystal members 1 are attached to the bellows 3 in any suitable manner as for example by cementing at the peripheral support surfaces 14 thereof, or by a spinning-over operation whereby a portion of the bellows clamps the edge of the ceramic disc.

The loading structure for the pair of Bimorph crystals, as maintained in spaced parallel relationship by the "Sylphon" bellows, is provided by the axial column assembly 2 which comprises a piston element 16 and a cylinder unit 17. The frictional engagement between the elements 16 and 17 is such that they are substantially fixed and function as a rigid column under normal operating conditions. The cylinder 17 is provided with a shoulder 18 which provides backing for the spring member 19 in compressional relationship with the under surface of the upper Bimorph crystal, when the crystal discs are subjected to severe shock conditions. This functions in correlation with the discs 4 to prevent damage to the crystal. The cylinder 17 further provides frictional guide surfaces at 21 for telescopic reception of the piston which is thereafter substantially fixed with respect thereto. The Bimorph crystals may be attached to this pillar assembly by any suitable arrangement, the instant showing being by use of screws 22. The upper Bimorph crystal unit is additionally provided with an orifice 23 which provides fluid communication between the interior and exterior volumes of the assembly. The housing assembly 30 to which the spider element 8 is attached by screws 25 to the bosses 26 thereof provides a chamber 24 for reception of fluid 27 which completely surrounds the bellows unit.

The upper expanse of the chamber 24 is closed by a formed rubber cover element 28 which is protected by a guard member 29 which maintains the assembled relationship of the cover 24 and housing member 30. The screws 31 which extend therethrough maintain sealed mating engagement of the cover and housing. The guard member 29 is provided with suitable apertures 32 for fluid communication between the surrounding water and the rubber cover 28 which in turn is preferably selected to provide the same acoustic impedance as sea water and thereby function as a means for imparting signal energy as applied at the exterior thereof to the coupling fluid of like acoustic impedance within the chamber and surrounding the crystal element. This chamber is well adapted for reception of the hydraulic fluid which provides this fluid communication between the rubber cover element and the outer crystal surfaces, the fluid being illustrated on one-half of the figure only for a better illustrative showing of the transducer components.

The housing is initially filled with fluid through the access filling hole 33 which is thereafter closed by the cap 34 after all air except that retained by the gas bag has been expelled from the interior of the chamber. The cap 34 maintains a sealed relationship with the housing 30 through compression of the gasket or O-ring member 15. The interior of a mine associated with the housing of the hydrophone is additionally maintained in sealed relationship with respect to the outside sea water by the O-ring 35 which functions to prevent seepage to the interior of the mine.

Referring now to FIG. 3 of the drawings there is shown a segmented electrode arrangement comprising three transducer elements on a single circular disc surface and mutually electrically insulated by the ceramic dielectric of the crystal disc which further separates the electrode areas 36 at the coadjacent peripheral limits thereof. These electrodes may be electrically inter-connected in series relationship by the attachment of suitable leads thereto as by soldering, or electroconductive paint or the like.

The signal energy loaded relationship of the Bimorph construction is shown in FIG. 5*a* and the static relationship in FIG. 5*b*. These illustrate respectively the normal polarity of the crystals as assembled under static or non-deformed conditions in the hydrophone unit, and the change of polarity of the voltages derived from the crystal under compressional stressing in the lower strata or extreme fiber zone under action of the diaphragm with application of a compressional wave front thereto. The relationship shown in FIG. 5*a* is applicable to an electroded configuration of FIG. 4*a* or through one segment of FIG. 4*b*. This same relationship of polarity change exists with respect to FIG. 4*c* in a manner thought to be apparent and therefore not separately shown.

The operation of the hydrophone as mounted in a mine casing in sealed relationship therewith is such as to present the rubber cover thereof into contact with the surrounding water in a manner whereby acoustic signals transmitted thereto through the water are passed by the cover to the internal coupling fluid of the hydrophone and applied as a uniformly distributed load to the faces of the centrally loaded Bimorph crystals exposed thereto. The voltage produced across each of the segments of the separate Bimorph units is connected in series relationship to provide an output voltage representing the summation of the averaged voltage across the several segments thereof. The fluid within the bellows which is displaced by signal energy loading action tends to compress the rubber sponge gas bag which thereafter reforms for the succeeding signal cycle.

The bleed-orifice 23 functions to pass low-frequency pressure changes due to wave and tide action.

It is thus apparent that a hydrophone has been disclosed which provides properties of greater sensitivity to signal influence applied thereto by the new and novel central loading arrangement wherein the periphery of the crystal is substantially freely suspended and the interior masked from signal energy.

Additionally it is to be understood that the unit may be used as a signal transmitting transducer wherein electric signal voltages applied to Bimorph crystals function to drive the crystal into vibrations and thereby impart signal energy to the fluid and thence to the surrounding water after the same is passed thereto by the rubber cover element.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A crystal hydrophone comprising a pair of circular parallel supported Bimorph ceramic crystal elements, a yieldable loading means extending transversely therebetween and axially thereof which is substantially rigid to signal energy effects, an axially expansible compliant peripheral supporting-and-masking means for said crystals and having a transverse cross-sectional area substantially coextensive therewith and connected therebetween in coaxial relationship with said loading means, and crystal bottoming suspension means disposed interiorly of said crystal supporting-and-masking means for preventing crystal damage under extereme signal load energy conditions, and a helical spring element encircling said yieldable loading means for restoring the crystal elements to an initial position when the extreme signal load energy has subsided.

2. In a hydrophone of the character disclosed, a casing, a yieldable cover therefor of material capable of effecting signal energy transmission therethrough, a Bimorph crystal microphone therein, suspension means for said microphone and suspended from said casing, fluid means for signal energy coupling between said cover and said microphone, said microphone comprising at least one pair of adjacent ceramic crystal discs in a Bimorph relationship and having a plurality of segmental electroded areas thereon, expansible bellows signal masking-supporting means therefor and having a transverse cross-section area substantially coextensive with each of said crystal discs, a pair of discs means in parallel with said ceramic discs enclosed within said bellows, and loading means for said Bimorph crystal discs interposed axially transversely with respect to said pair of discs means and supported thereby.

3. The structure of claim 2 further characterized by the inclusion in said microphone of anti-overload means supported in parallel spaced adjacency to the bellows suspension means, and a helical spring on said loading means for yieldably maintaining said crystals normally out of contact with said anti-overload means, and for repositioning the same after each application of overload stress thereto.

4. In a hydrophone of the character disclosed, a casing a yieldable cover therefor of material capable of effecting signal energy transmission therethrough, a pair of circular ceramic Bimorph crystal microphone elements therein, axial loading means for said microphone element interposed between said Bimorph crystal elements, fluic means for signal energy coupling between said cove and said microphone elements, said microphone element comprising segmented parallel electrodes on each of th Bimorph ceramic crystal elements, means connecting th plurality of electroded areas thereon in a manner to pro vide a series additive voltage output therefrom unde signal loading, expansible bellows-type signal maskin means having a transverse cross-sectional area substan tially coextensive with the cross-sectional area of sai microphone elements and interposed therebetween, sus pension means for said bellows means, fluid means fo coupling said signal energy passed by said cover to sai pair of Bimorph crystal elements, anti-overload mean supported in parallel spaced adjacency to the bellow suspension means, a normally inactive means in sai loading means for maintaining said crystals normally ou of contact with said anti-overload means, and means in cluding a helical spring element providing yieldable load ing under peak signal conditions for repositioning th same after the occurrence of the application of overloa stresses thereto.

References Cited in the file of this patent

UNITED STATES PATENTS

| | | |
|---|---|---|
| 1,409,341 | Harrison | Mar. 14, 192 |
| 2,105,010 | Sawyer | Jan. 11, 193 |
| 2,126,436 | Williams | Aug. 9, 193 |
| 2,421,026 | Hall | May 27, 194 |
| 2,565,159 | Williams | Aug. 21, 195 |
| 2,576,155 | Trent | Nov. 27, 195 |
| 3,002,179 | Kuester | Sept. 26, 196 |